(12) United States Patent
Lindsay

(10) Patent No.: US 12,361,498 B1
(45) Date of Patent: Jul. 15, 2025

(54) SYSTEMS AND METHODS FOR VEHICLE PURCHASE MANAGEMENT

(71) Applicant: Stephen Lindsay, Columbus, OH (US)

(72) Inventor: Stephen Lindsay, Columbus, OH (US)

( * ) Notice: Subject to any disclaimer, the term of this patent is extended or adjusted under 35 U.S.C. 154(b) by 269 days.

(21) Appl. No.: 18/222,082

(22) Filed: Jul. 14, 2023

Related U.S. Application Data

(60) Provisional application No. 63/389,703, filed on Jul. 15, 2022.

(51) Int. Cl.
*G06Q 40/08* (2012.01)
*G06Q 30/0601* (2023.01)

(52) U.S. Cl.
CPC ......... *G06Q 40/08* (2013.01); *G06Q 30/0641* (2013.01)

(58) Field of Classification Search
CPC .......................... G06Q 40/08; G06Q 30/0641
See application file for complete search history.

(56) References Cited

U.S. PATENT DOCUMENTS 11,900,435 B2 * 2/2024 Gaur ...................... G06N 20/00
2019/0143997 A1 * 5/2019 Crimando ......... B60W 50/0098
701/37

* cited by examiner

*Primary Examiner* — Scott S Trotter
(74) *Attorney, Agent, or Firm* — ICE MILLER LLP

(57) ABSTRACT

A non-transitory computer-readable apparatus having instructions stored thereon such that, when such instructions are executed by a computing device, the computing device is caused to perform operations resulting in improvement of the post-agreement portion of a vehicle purchase transaction.

24 Claims, 17 Drawing Sheets

FIG. 12

SYSTEMS AND METHODS FOR VEHICLE PURCHASE MANAGEMENT

RELATED APPLICATION

This application claims the benefit of U.S. Provisional Application No. 63/389,703, filed on Jul. 15, 2022. The disclosure of this prior application is incorporated herein by reference in its entirety for all purposes.

BACKGROUND

Most automobile dealership purchases follow a similar process. The customer selects a vehicle, and then the customer and the dealership then agree on a price for the vehicle. From the customer's standpoint, the transaction is then nearly complete. However, this is not the case. After a price is agreed upon, the customer's automobile purchase enters an often lengthy process that is not visible to most automobile dealership customers. This post-agreement process, called finance and insurance review ("F&I"), involves, among other things, confirming the customer's creditworthiness, confirming that the customer has financing in place for the vehicle or if the customer has no pre-arranged financing then developing financing options for the customer, confirming the customer's insurance coverage for the purchased vehicle, and preparing the paperwork to finalize the sale and delivery of the purchased vehicle. These F&I process often takes longer than an hour, during which time the customer is required to wait. The period of waiting disrupts the flow of the vehicle purchase, resulting almost always in customer dissatisfaction and in extreme cases cancellation of the vehicle purchase. Accordingly, there is a need in the art for improved systems and methods for improving the post-agreement portion of a vehicle purchase.

SUMMARY

Embodiments described herein provide an interactive customer vehicle purchase management platform to facilitate an automobile dealership customer's control over their post-agreement experience.

According to embodiments of the present disclosure, systems and methods for vehicle purchase management (sometimes referred to as ZIPDEAL™) allow vehicle dealerships to configure the post-agreement experience for their customers, and permit a customer to streamline and optimize the process for preparing for vehicle ownership.

The vehicle purchase management platform according to this disclosure is an interactive experience where customers have control over their experience, personalize their vehicle, add on extras, and exit the post-agreement experience more satisfied. Unlike conventional systems and methods, the vehicle purchase management platform according to this disclosure can be configured to link all post-agreement automobile purchase processes on one customer-facing platform. The vehicle purchase management platform according to this disclosure guides customers through the titling and registration process, acquisition of insurance information, exposure to finance and protection products, vehicle features, personal vehicle settings, and submission of online reviews. By putting customers in control and by keeping the customer engaged while F&I activities are underway out of the customer's view, dealerships deliver a consistent and personalized delivery experience that improves customer satisfaction with the sales process, improves customer satisfaction with the vehicle that the customer ultimately receives, while mitigating frustrating customer downtime during the F&I process.

In at least one embodiment, the present invention comprises a computer-implemented system comprising: a memory; a processor coupled to the memory and configured to, based on instructions stored in the memory, perform operations comprising: retrieving a first identifier associated with an automotive vehicle from a storage location; retrieving vehicle data related to the automotive vehicle off the storage location; retrieving a second identifier associated with a customer from a storage location; retrieving customer data related to the customer off the storage location; associating the vehicle data and the customer data to one or more modules for performing post-agreement process, the post-agreement process being configured to generate information for transmission to a user system; transmitting, by the one or more modules, a user interface to a customer system; generating a trigger event for the customer based on a predetermined rule; generating, in response to the customer trigger event, a notification for a user of the user system, wherein the user is associated with a vehicle dealer; and sending the notification to the user based on contact information of the user in a dealer record.

In at least one embodiment of a computer-implemented system according to the present invention, the operations further comprise: associating the vehicle data and the customer data to a personalization module to generate the user interface, wherein the user interface provides one or more customized insurance policy quotes from one or more insurance providers.

In at least one embodiment of a computer-implemented system according to the present invention, the operations further comprise: associating the vehicle data and the customer data to a personalization module to generate the user interface, wherein the user interface provides one or more customized add-on modules based on a dealer configuration.

In at least one embodiment of a computer-implemented system according to the present invention, the operations further comprise: associating the vehicle data and the customer data to a personalization module to generate the user interface, wherein the user interface provides one or more options for vehicle-specific accessories based on the vehicle data.

In at least one embodiment of a computer-implemented system according to the present invention, the operations further comprise: performing an automated pre-F&I interview with the customer by the one or more modules.

In at least one embodiment of a computer-implemented system according to the present invention, the operations further comprise: promoting appearance protection packages to the customer, the appearance protection packages associated with the vehicle data and configured by the dealer.

In at least one embodiment of a computer-implemented system according to the present invention, the operations further comprise: associating the vehicle data and the customer data to a personalization module to generate the user interface, wherein the user interface provides one or more options to personalize a customer's radio presets.

In at least one embodiment of a computer-implemented system according to the present invention, the operations further comprise: associating the vehicle data and the customer data to a personalization module to generate the user interface, wherein the user interface provides one or more options for vehicle-specific products based on the vehicle data such as extended warranties, vehicle protection packages, and tire protection packages.

In at least one embodiment, the present invention comprises a computer-implemented method, wherein one or more computing devices comprising non-transitory memory and at least one processor are programmed to perform steps comprising: retrieving, by at least one processor, a first identifier associated with an automotive vehicle from a storage location; retrieving, by the at least one processor, vehicle data related to the automotive vehicle off the storage location; retrieving, by the at least one processor, a second identifier associated with a customer from a storage location; retrieving, by the at least one processor, customer data related to the customer off the storage location; associating, by the at least one processor, the vehicle data and the customer data to one or more modules for performing post-agreement process, the post-agreement process being configured to generate information for transmission to a user system; transmitting, by the one or more modules, a user interface to a customer system; generating a trigger event for the customer based on a predetermined rule; generating, in response to the customer trigger event, a notification for a user of the user system, wherein the user is associated with a vehicle dealer; and sending the notification to the user based on contact information of the user in a dealer record.

In at least one embodiment of a computer-implemented method according to the present invention, the operations further comprise: associating the vehicle data and the customer data to a personalization module to generate the user interface, wherein the user interface provides one or more customized insurance policy quotes from one or more insurance providers.

In at least one embodiment of a computer-implemented method according to the present invention, the operations further comprise: associating the vehicle data and the customer data to a personalization module to generate the user interface, wherein the user interface provides one or more customized add-on modules based on a dealer configuration.

In at least one embodiment of a computer-implemented method according to the present invention, the operations further comprise: associating the vehicle data and the customer data to a personalization module to generate the user interface, wherein the user interface provides one or more options for vehicle-specific accessories based on the vehicle data.

In at least one embodiment of a computer-implemented method according to the present invention, the operations further comprise: performing an automated pre-F&I interview with the customer by the one or more modules.

In at least one embodiment of a computer-implemented method according to the present invention, the operations further comprise: promoting appearance protection packages to the customer, the appearance protection packages associated with the vehicle data and configured by the dealer.

In at least one embodiment of a computer-implemented method according to the present invention, the operations further comprise: associating the vehicle data and the customer data to a personalization module to generate the user interface, wherein the user interface provides one or more options to personalize a customer's radio presets.

In at least one embodiment of a computer-implemented method according to the present invention, the operations further comprise: associating the vehicle data and the customer data to a personalization module to generate the user interface, wherein the user interface provides one or more options for vehicle-specific products based on the vehicle data such as extended warranties, vehicle protection packages, and tire protection packages.

In at least one embodiment, the present invention comprises a non-transitory computer-readable apparatus having instructions stored thereon that, when executed by a computing device, cause the computing device to perform operations comprising: retrieving, by the computer device, a first identifier associated with an automotive vehicle from a storage location; retrieving, by the computer device, vehicle data related to the automotive vehicle off the storage location; retrieving, by the computer device, a second identifier associated with a customer from a storage location; retrieving, by the computer device, customer data related to the customer off the storage location; associating, by the computer device, the vehicle data and the customer data to one or more modules for performing post-agreement process, the post-agreement process being configured to generate information for transmission to a user system; transmitting, by the one or more modules, a user interface to a customer system; generating a trigger event for the customer based on a predetermined rule; generating, in response to the customer trigger event, a notification for a user of the user system, wherein the user is associated with a vehicle dealer; and sending the notification to the user based on contact information of the user in a dealer record.

In at least one embodiment of a non-transitory computer-readable apparatus according to the present invention, the operations further comprise: associating the vehicle data and the customer data to a personalization module to generate the user interface, wherein the user interface provides one or more customized insurance policy quotes from one or more insurance providers.

In at least one embodiment of a non-transitory computer-readable apparatus according to the present invention, the operations further comprise: associating the vehicle data and the customer data to a personalization module to generate the user interface, wherein the user interface provides one or more customized add-on modules based on a dealer configuration.

In at least one embodiment of a non-transitory computer-readable apparatus according to the present invention, the operations further comprise: associating the vehicle data and the customer data to a personalization module to generate the user interface, wherein the user interface provides one or more options for vehicle-specific accessories based on the vehicle data.

In at least one embodiment of a non-transitory computer-readable apparatus according to the present invention, the operations further comprise: performing an automated pre-F&I interview with the customer by the one or more modules.

In at least one embodiment of a non-transitory computer-readable apparatus according to the present invention, the operations further comprise: promoting appearance protection packages to the customer, the appearance protection packages associated with the vehicle data and configured by the dealer.

In at least one embodiment of a non-transitory computer-readable apparatus according to the present invention, the operations further comprise: associating the vehicle data and the customer data to a personalization module to generate the user interface, wherein the user interface provides one or more options to personalize a customer's radio presets.

In at least one embodiment of a non-transitory computer-readable apparatus according to the present invention, the operations further comprise: associating the vehicle data and the customer data to a personalization module to generate the user interface, wherein the user interface provides one or more options for vehicle-specific products based on the vehicle data such as extended warranties, vehicle protection packages, and tire protection packages.

BRIEF DESCRIPTION OF THE DRAWINGS/FIGURES

FIG. 12 illustrates an exemplary customer interface according to an embodiment of the present disclosure.

DETAILED DESCRIPTION

Figure 1:
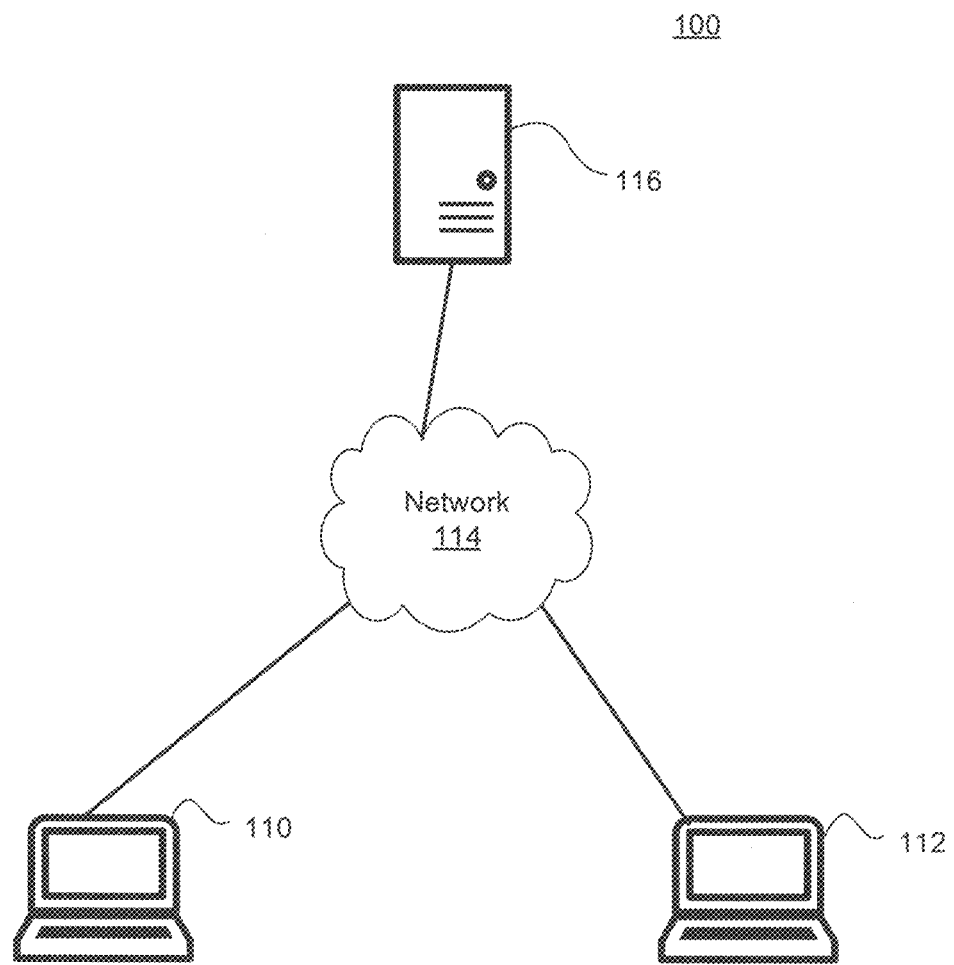
FIG. 1 depict an example system for dealer management, according to some embodiments.

FIG. 1 illustrates a block diagram of a vehicle purchase management platform 100 (sometimes referred to as ZIPDEAL™) that operates in accordance with embodiments described below to allow a provider, such as an automobile dealer, to interact with customers after an automobile purchase agreement has been reached. In at least one embodiment, the vehicle purchase management platform 100 includes a server computer 116, a dealer computer 110, and a client computer 112, wherein the dealer computer 110 and the client computer 112 are in electronic communication with the server computer 116 via a communication link 114, such as, but not limited to, the Internet.

In certain embodiments, vehicle purchase management platform 100 provides a variety of post-agreement modules, such as a vehicle personalization module, an insurance module, a pre-F&I module, and a loyalty module.

In certain embodiments, vehicle purchase management platform 100 can include a vehicle purchase management personalization module, which can be configured to provide an interface enabling clients to review customizable accessory options. Subscribed dealers can improve accessory awareness by implementing vehicle purchase management platform 100.

In some embodiments, vehicle purchase management platform 100 can include server computer 116 configured with instructions to retrieve a first identifier associated with an automotive vehicle from a storage location and to retrieve vehicle data related to the automotive vehicle from a storage location. In some embodiments, the instructions can further include retrieving a second identifier associated with a customer from a storage location and retrieving customer data related to the customer from a storage location. The server computer 116 can be configured to associate the vehicle data and the customer data to one or more modules for performing post-agreement process, the post-agreement process being configured to generate information for transmission to a user system.

In some embodiment, one or more modules can be configured to transmit a user interface to a customer system, i.e., client computer 112 and generate a trigger event for the customer based on a predetermined rule. In some embodiments, the one or more modules can be configured to generate, in response to the customer trigger event, a notification for a user of the user system, wherein the user is associated with a vehicle dealer. The server computer 110 can be configured to send the notification to the user based on contact information of the user in a dealer record.

In some embodiments, the vehicle purchase management platform 100 includes modules facilitating personalization and customization by the customer. In some embodiments, such a personalization module includes one or more interfaces that can have options enabling a customer to personalize their radio (e.g., AM, FM, SiriusXM) presets and pre-select other vehicle features, which then can be configured by the dealership based on the customer's selections prior to the time the customer receives the vehicle delivery.

In some embodiments, a personalization module of vehicle purchase management platform 100 can recommend vehicle-specific accessories according to the vehicle for which agreement has been reached. Vehicle purchase management platform 100 provides configuration tools for each dealer to arrange customized add-on modules, specifically designed to increase dealer options. The vehicle purchase management platform 100 personalization module exposes customers to their vehicles' most popular accessories and can be based on each dealer's specific configuration.

In certain embodiments, vehicle purchase management platform 100 can include an insurance module that can be configured to educate a customer about available insurance plan options and services. The vehicle purchase management platform according to this disclosure can retrieve vehicle information for the vehicle that the customer has agreed to purchase, and automatically retrieve one or more insurance options available from the customer's current insurance provider as well as additional options from one or more other insurance providers.

In certain embodiments, vehicle purchase management platform 100 can include a pre-F&I module. For example, a pre-F&I module can be configured to perform an automated pre-F&I interview with a customer. In another example, a pre-F&I module can be configured to promote a dealer's appearance protection packages to the customer, and/or can be configured to showcase supporting videos or marketing materials. The pre-F&I module can be configured to provide educational information, such as videos and other materials that expose customers to additional finance products, such as extended warranties, vehicle and tire protection packages, and the like.

In certain embodiments, vehicle purchase management platform 100 can include a loyalty module configured to automatically provide customers with the ability to schedule an initial service visit in accordance with vehicle information about the vehicle subject to purchase. Additionally, or alternatively, a loyalty module can be configured to connect a customer's device to an OEM mobile application download process. In some embodiments, the loyalty module can provide information about the customer and/or the vehicle to the OEM mobile application. In some embodiments, the loyalty module can survey the customer's sentiments about the vehicle In some embodiments, vehicle purchase management platform 100 can include additional modules, including modules directed to the collection of customer attribution, configured to determining which marketing channels led the customer to a particular dealership.

In some embodiments, vehicle purchase management platform 100 offers a built-in sales reputation management tool. Customers can be presented with an early-exit survey, for example, based on a 5-star scoring model. Reviews can be solicited during the vehicle purchase management process to share feedback online, increasing positive reviews for subscribed dealerships According to some embodiments, vehicle purchase management platform 100 can be configured to passively inquire with customers about family members or colleagues that may be in the market for a new or pre-owned vehicle. According to some embodiments, vehicle purchase management platform 100 can be configured to immediately (i.e., in real time) communicate important sales and F&I behavioral data to dealership personnel via a dealer system, such as dealer system 110. Personalized settings and other timely alerts are sent out to various members of the dealership personnel team as configured according to the individual dealer, which enable prompt engagement with the customer.

According to some embodiments, vehicle purchase management platform 100 can be configured to expose every customer to opportunities beyond the vehicle purchase. Vehicle purchase management platform 100 can increase opportunity for dealers by engaging customers through a natural point-and-click experience on their own terms, freeing up dealer personnel to complete other vehicle sale activities. According to some embodiments, vehicle purchase management platform 100 can be configured to promote dealer appearance protection packages, including showcasing time-of-sale videos about the subscribed dealership's products.

In some embodiments, vehicle purchase management platform 100 can be configured with a COMPARE-QUOTE™ insurance policy comparison module that allows customers of a subscribing dealer to compare their current insurance policy against policies offered by other insurance providers.

In some embodiments, vehicle purchase management platform 100 can be configured to automatically set up a first service appointment, allowing the subscribed dealer's service team to make the first great impression and secure a service customer.

In some embodiments, vehicle purchase management platform 100 can be implemented using business rules to adaptive workflows. Business rules configured within vehicle purchase management platform 100 may adapt workflows within vehicle purchase management platform 100 according to data transmitted by a dealer representative such as, for example, by way of dealer system 210 and/or dealer system 310. Business rules configured within vehicle purchase management platform 100 may adapt workflows within vehicle purchase management platform 100 according to data transmitted by a customer such as, for example, by way of client system 212 and/or client system 312.

In some embodiments, vehicle purchase management platform 100 can be configured to provide an artificial intelligence solution in terms of providing vehicle equipment data, options and matching accessories to help dealers increase their customers' satisfaction and deliver an improved customer experience, while increasing revenue streams. Vehicle purchase management platform 100 can be implemented using artificial intelligence and machine learning algorithms, to enable subscribed dealers to reduce barriers associated with closing vehicle sales by providing customers with access to information about the vehicle being purchased, which can help them determine how certain add-ons and accessories might impact their payment and financing options.

According to some embodiments, vehicle purchase management platform 100 can be configured to leverage artificial intelligence and machine learning algorithms to extract and categorize VIN-level information and provide standardized OEM specifications for each vehicle. The integration of artificial intelligence and machine learning algorithms with vehicle purchase management is a benefit to dealers seeking better, more robust data about a vehicle's exact specifications. Additional benefits of this solution allow automotive dealers to increase revenue derived per vehicle through add-ons and accessories that are critical to a dealership's bottom line, improve customer satisfaction and tenure through a consistent and personalized delivery experience, and reduce time and expenses associated with contracts in transit after vehicle delivery. Automotive data contains extremely valuable information about a vehicle, however it may not always easy for buyers or sellers to discern a vehicle's actual equipment, trim or options using a standard VIN decode. The vehicle purchase management platform according to this disclosure leverages artificial intelligence and machine learning solutions to provide automotive dealers and their customers an improved car buying experience.

Figure 2:
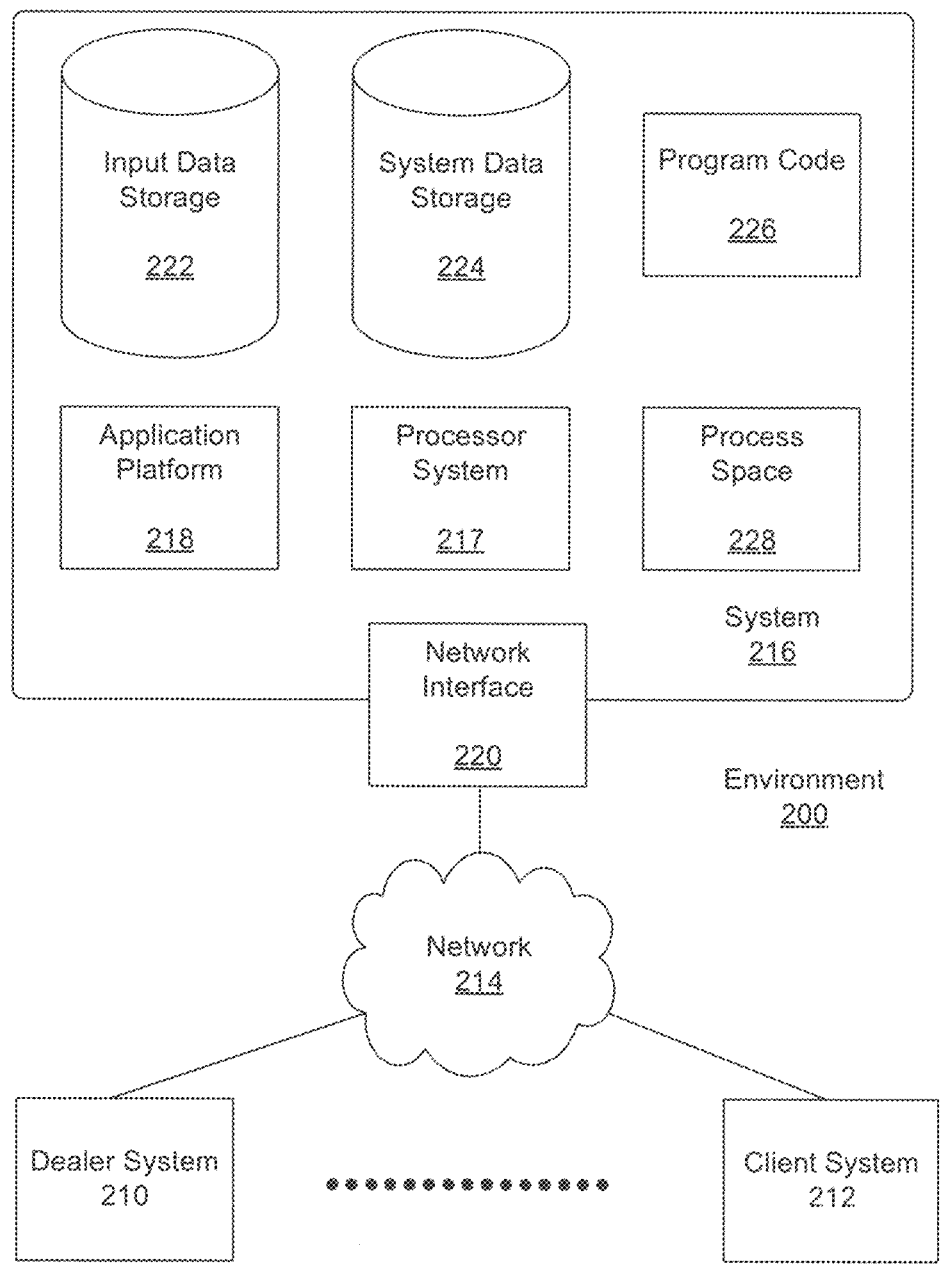
FIG. 2 depicts an example operating environment of a dealer management platform, according to some embodiments.

FIG. 2 illustrates a block diagram of an environment 200 wherein vehicle purchase management methods might be deployed. The environment 200 may include dealer systems 210, a network 214, a system 216, a processor system 217, an application platform 218, a network interface 220, a dealer data storage 222, a system data storage 224, program code 226, and a process space 228. In other embodiments, the environment 200 may not have all of the components listed and/or may have other elements instead of, or in addition to, those listed above.

In at least one embodiment, dealer system 210 may be any machine or system that is used by a dealer to access a dealer management system according to the present disclosure. For example, any of the dealer systems 210 may be a handheld computing device, a mobile phone, a laptop computer, a workstation, and/or a network of computing devices. As illustrated in FIG. 2 the dealer systems 210 might interact via the network 214 with an on-demand database service, which is the system 216.

An on-demand database service, such as the system 216, is a database system that is made available to outside dealers that do not need to necessarily be concerned with building and/or maintaining the database system, but instead may be available for their use when the dealers need the database system (e.g., on the demand of the dealers). Some on-demand database services may store information from one or more dealers stored into tables of a common database image to form a dealer database system (DDS). Accordingly, the "on-demand database service 216" and the "system 216" will be used interchangeably herein. A database image may include one or more database objects. A relational database management system (RDMS) or the equivalent may execute storage and retrieval of information against the database object(s). The application platform 218 may be a framework that allows the applications of the system 216 to run, such as the hardware and/or software, e.g., the operating system. In an embodiment, the on-demand database service 216 may include the application platform 218 which enables creation, managing and executing one or more applications developed by the provider of the on-demand database service, dealers accessing the on-demand database service via dealer systems 210, or third-party application developers accessing the on-demand database service via the dealer systems 210.

The users of the dealer systems 210 may differ in their respective capacities, and the capacity of a particular dealer system 210 might be entirely determined by permissions (permission levels) for the current dealer. For example, where a salesperson is using a particular dealer system 210 to interact with the system 216, that dealer system 210 has the capacities allotted to that salesperson. However, while an administrator is using that dealer system 210 to interact with the system 216, that dealer system 210 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 214 is any network or combination of networks of devices that communicate with one another. For example, the network 214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The dealer systems 210 might communicate with the system 216 using TCP/IP and, at a higher network level, use other common Internet protocols to communicate, such as HTTP, FTP, AFS, WAP, etc. In an example where HTTP is used, the dealer systems 210 might include an HTTP client commonly referred to as a "browser" for sending and receiving HTTP messages to and from an HTTP server at the system 216. Such an HTTP server might be implemented as the sole network interface between the system 216 and the network 214, but other techniques might be used as well or instead. In some implementations, the interface between the system 216 and the network 214 includes load sharing functionality, such as round-robin HTTP request distributors to balance loads and distribute incoming HTTP requests evenly over a plurality of servers. At least as for the users that are accessing that server, each of the plurality of servers has access to the DDS's data; however, other alternative configurations may be used instead.

In one embodiment, the system 216, shown in FIG. 2, implements a web-based vehicle purchase management system. For example, in one embodiment, the system 216 includes application servers configured to implement and execute platform software applications as well as provide related data, code, forms, webpages and other information to and from the dealer systems 210 and to store to, and retrieve from, a database system related data, objects, and webpage content. With a multi-dealer system, data for multiple dealers may be stored in the same physical database object, however, dealer data typically is arranged so that data of one dealer is kept logically separate from that of other dealers so that one dealer does not have access to another dealer's data, unless such data is expressly shared. In certain embodiments, the system 216 implements applications other than, or in addition to, a platform application. For example, the system 216 may provide dealer access to multiple hosted (standard and custom) applications, including a platform application. Dealer (or third-party developer) applications, which may or may not include platform, may be supported by the application platform 218, which manages creation, storage of the applications into one or more database objects, and executing of the applications in a virtual machine in the process space of the system 216.

One arrangement for elements of the system 216 is shown in FIG. 2, including the network interface 220, the application platform 218, the dealer data storage 222 for dealer data 223, the system data storage 224 for system data 225 accessible to the system 216 and possibly multiple dealers, the program code 226 for implementing various functions of the system 216, and the process space 228 for executing DDS system processes and dealer-specific processes, such as running applications as part of an application hosting service. Additional processes that may execute on the system 216 include database indexing processes.

Several elements in the system shown in FIG. 2 include conventional, well-known elements that are explained only briefly here. For example, each of the dealer systems 210 could include a desktop personal computer, workstation, laptop, PDA, cell phone, or any wireless access protocol (WAP) enabled device or any other computing device capable of interfacing directly or indirectly to the Internet or other network connection. Each of the dealer systems 210 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a dealer (e.g., subscriber of the dealer database system) of the dealer systems 210 to access, process and view information, pages and applications available to it from the system 216 over the network 214. Each of the dealer systems 210 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 216 or other systems or servers. For example, the user interface device may be used to access data and applications hosted by the system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the dealer systems 210 and all of its components are operator configurable using applications, such as a browser, including computer code run using a central processing unit such as an Intel Pentium® processor or the like. Similarly, the system 216 (and additional instances of an DDS, where more than one is present) and all of their components might be operator configurable using application(s) including computer code to run using a central processing unit such as the processor system 217, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 216 to intercommunicate and to process webpages, applications and other data and media content as described herein are, for example, downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 216 is configured to provide webpages, forms, applications, data and media content to the client (e.g., customer) systems 212 to support the access by the dealer systems 210 as dealers of the system 216. As such, the system 216 provides security mechanisms to keep each dealer's data separate unless the data is shared. If more than one DDS is used, they may be located in close proximity to one another (e.g., in a server farm located in a single building or campus), or they may be distributed at locations remote from one another (e.g., one or more servers located in city A and one or more servers located in city B). As used herein, each DDS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 3:
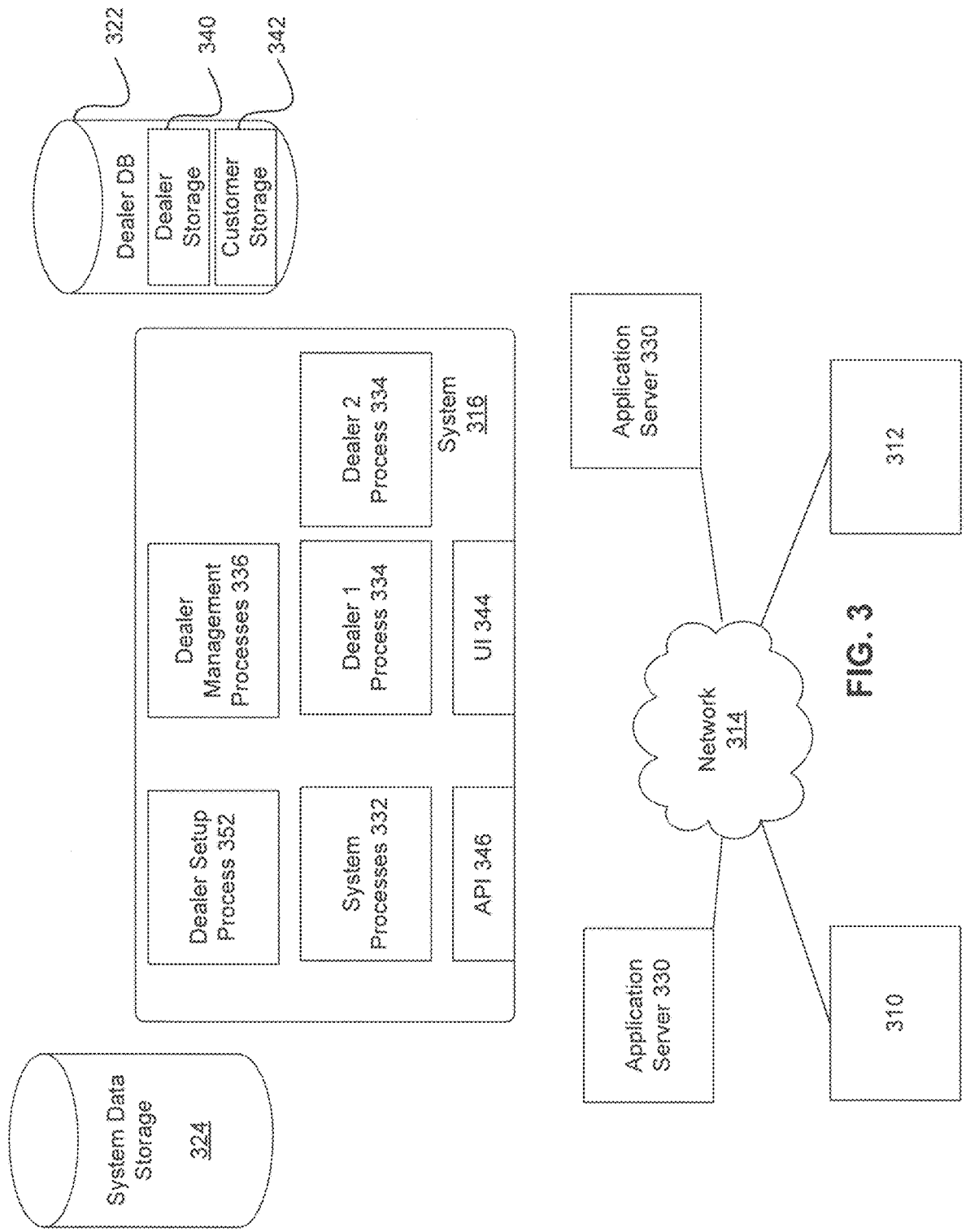
FIG. 3 depicts an example operating environment of a dealer management platform, according to some embodiments.

FIG. 3 also illustrates dealer systems 310. However, in FIG. 3 elements of the system 316 and various interconnections in an embodiment are further illustrated. FIG. 3 shows that the each of the dealer systems 310 may include a processor system, a memory system, an input system, and an output system. FIG. 3 shows the network 314 and the system 316. FIG. 3 also shows that the system 316 may include the dealer data storage 322, the dealer data 323, the system data storage 324, the system data 325, a User Interface (UI) 344, an Application Program Interface (API) 346, a dealer setup mechanism 352, applications servers 330, a system process space 332, dealer process spaces 334, a dealer management process space 336, a dealer storage area 340, and a customer storage 342. In other embodiments, the environment 310 may not have the same elements as those listed above and/or may have other elements instead of, or in addition to, those listed above.

As shown by FIG. 3, the system 316 may include the network interface 320 implemented as a set of HTTP application servers 330, the application platform 318, the dealer data storage 322, and the system data storage 324. Also shown is the system process space 332, including individual dealer process spaces 334 and the dealer management process space 336. Each application server 330 may be configured to access dealer data storage 322 and the dealer data 323 therein, and the system data storage 324 and the system data 325 therein to serve requests of the dealer systems 310. The dealer data 323 might be divided into individual dealer storage areas 338, which may be either a physical arrangement and/or a logical arrangement of data. Within each dealer storage area 322, the customer storage 342 might be similarly allocated for each customer. The UI 344 provides a user interface and the API 346 provides an application programmer interface to the system 316 resident processes to customers and/or developers at the dealer systems 310. The dealer data and the system data may be stored in various databases, such as one or more databases.

The application platform 318 includes the application setup mechanism 352 that supports application developers' creation and management of applications, which may be saved as metadata into the dealer data storage 322 by the save routines 350 for execution by subscribers as one or more dealer process spaces 334 managed by the dealer management process 336 for example. Invocations to such applications may be coded using PL/SOQL that provides a programming language style interface extension to the API 346.

Each application server 330 may be communicably coupled to database systems, e.g., having access to the system data 325 and the dealer data 323, via a different network connection. For example, one application server 330-1 might be coupled via the network 314 (e.g., the Internet), another application server 330-N might be coupled via a direct network link, and another application server 330-N might be coupled by yet a different network connection. Transfer Control Protocol and Internet Protocol (TCP/IP) are typical protocols for communicating between application servers 330 and the database system. However, it will be apparent to one skilled in the art that other transport protocols may be used to optimize the system depending on the network interconnect used.

In certain embodiments, each application server 330 is configured to handle requests for any user associated with any organization that is a dealer. Because it is desirable to be able to add and remove application servers from the server pool at any time for any reason, there is no server affinity for a customer and/or organization to a specific application server 330. In one embodiment, therefore, an interface system implementing a load balancing function (e.g., an F5 Big-TP load balancer) is communicably coupled between the application servers 330 and the dealer systems 310 to distribute requests to the application servers 330. In one embodiment, the load balancer uses a least connections algorithm to route customer requests to the application servers 330. Other examples of load balancing algorithms, such as round robin and observed response time, also may be used. For example, in certain embodiments, three consecutive requests from the same customer could hit three different application servers 330, and three requests from different customers could hit the same application server 330. In this manner, the system 316 is multi-dealer, wherein the system 316 handles storage of, and access to, different objects, data and applications across disparate customers and organizations. As an example of storage, one dealer might be a company that employs a sales force where each salesperson uses the system 316 to manage their sales process.

In certain embodiments, the dealer systems 310 (which may be client systems) communicate with the application servers 330 to request and update system-level and dealer-level data from the system 316 that may require sending one or more queries to the dealer data storage 322 and/or the system data storage 324. The system 316 (e.g., an application server 330 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a platform database may include a table that describes a customer with fields for basic contact information such as name, address, phone number, fax number, etc. Another table might describe a purchase order, including fields for information such as customer, product, sale price, date, etc. In some dealer database systems, standard entity tables might be provided for use by all dealers. For platform database applications, such standard entities might include tables for Account, Contact, Lead, and Opportunity data, each containing pre-defined fields. It should be understood that the word "entity" may also be used interchangeably herein with "object" and "table".

In some dealer database systems, dealers may be allowed to create and store custom objects, or they may be allowed to customize standard entities or objects, for example by creating custom fields for standard objects, including custom index fields.

Customer or client as referred to interchangeably herein refers to an individual or entity that agrees to a purchase of a vehicle. Dealer as referred to herein refers to individuals, companies or other entities that vend products or services to customers, e.g., a vehicle dealer.

Figure 4:
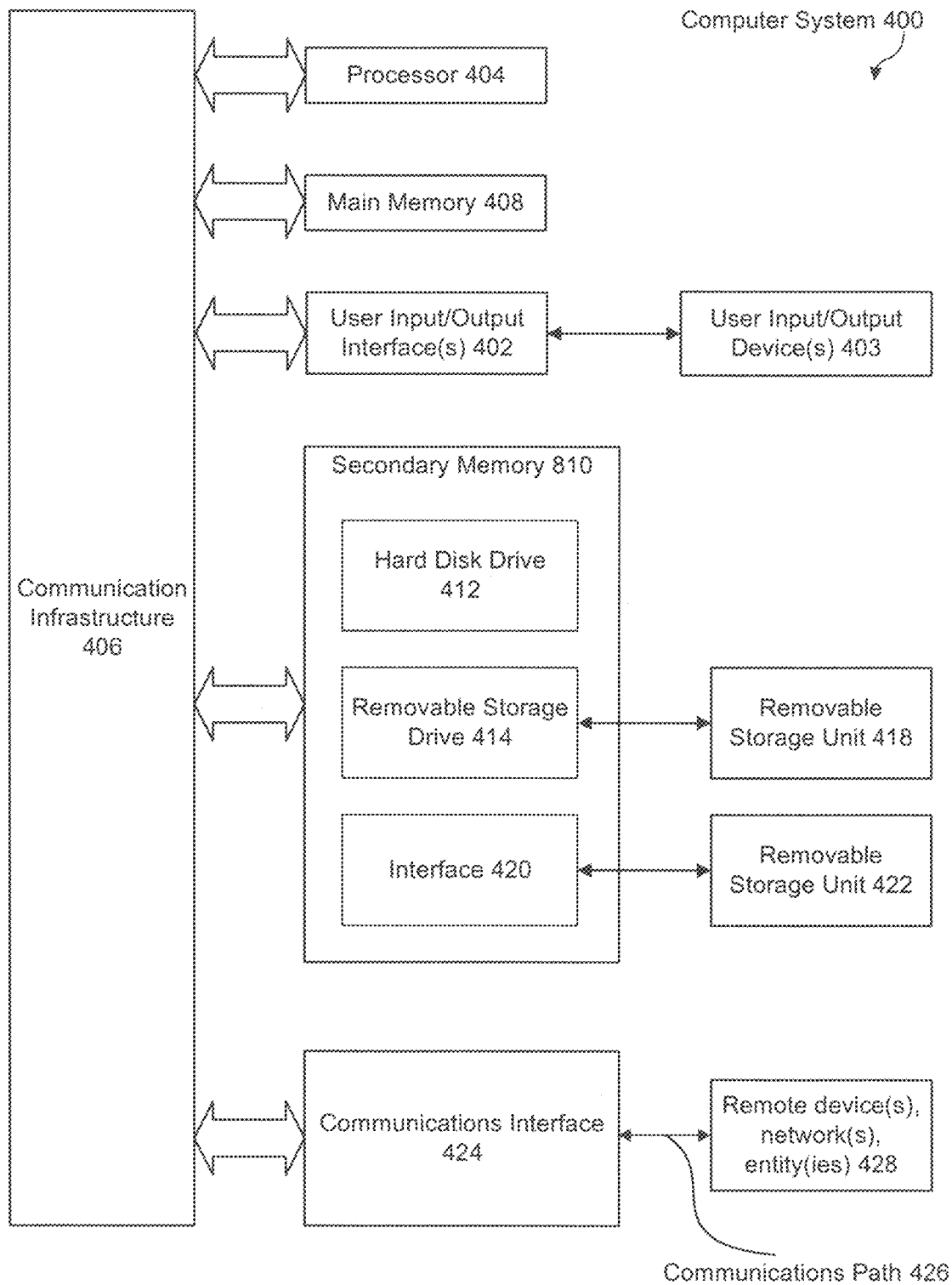
FIG. 4 illustrates an example computer system which may be used for implementing various embodiments presented herein.

Various embodiments may be implemented using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main (or primary) memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 or a removable storage device or drive 414. Removable storage drive 414 may be a floppy disk drive, a magnetic tape drive, a compact disk drive, an optical storage device, tape backup device, or any other storage device/drive.

Removable storage drive 414 may interact with a removable storage unit 418. Removable storage unit 418 may include a computer usable or readable storage device having stored thereon computer software (control logic) or data. Removable storage unit 418 may be a floppy disk, magnetic tape, compact disk, DVD, optical storage disk, or any other computer data storage device. Removable storage drive 414 may read from or write to removable storage unit 418.

Secondary memory 410 may include other means, devices, components, instrumentalities, or other approaches for allowing computer programs or other instructions or data to be accessed by computer system 400. Such means, devices, components, instrumentalities, or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 400 may further include a communications or network interface 424. Communications interface 424 may enable computer system 400 to communicate and interact with any combination of external devices, external networks, external entities, etc. (individually and collectively referenced by reference number 428). For example, communications interface 424 may allow computer system 400 to communicate with external or remote devices 428 over communications path 426, which may be wired or wireless (or a combination thereof), and which may include any combination of LANs, WANs, the Internet, etc. Control logic or data may be transmitted to and from computer system 400 via communications path 426.

Computer system 400 may also be any of a personal digital assistant (PDA), desktop workstation, laptop or notebook computer, netbook, tablet, smart phone, smart watch or other wearable, appliance, part of the Internet-of-Things, or embedded system, to name a few non-limiting examples, or any combination thereof.

Computer system 400 may be a client or server, accessing or hosting any applications or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems, or computer architectures other than that shown in FIG. 4. In particular, embodiments can operate with software, hardware, and/or operating system implementations other than those described herein.

Figure 5:
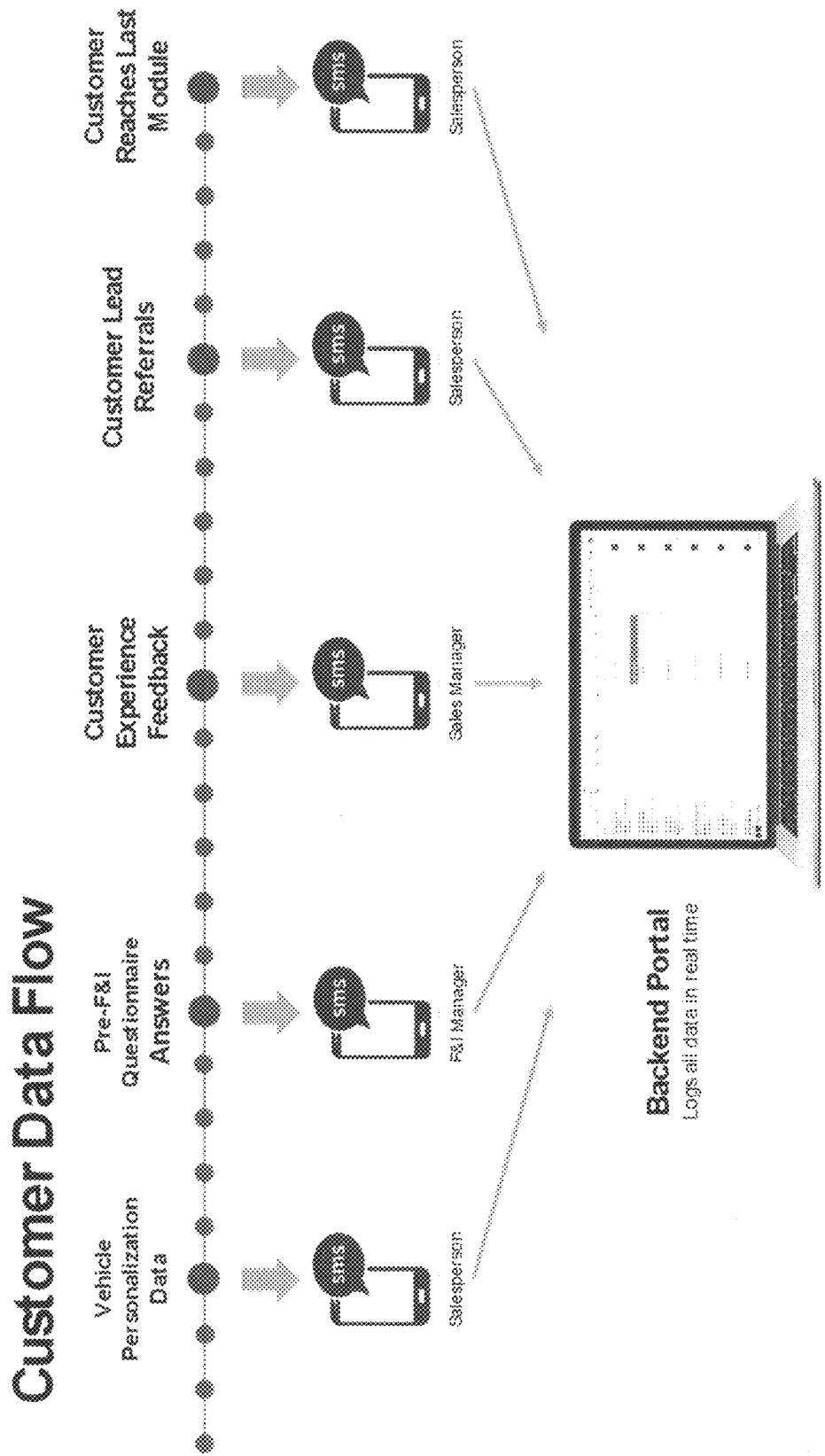
FIG. 5 illustrates an administrative portal according to an embodiment of the present disclosure.

FIG. 5 illustrates an exemplary embodiment of dealer system 210 and/or dealer system 310. According to at least one embodiment, dealer system 210 and/or dealer system 310 comprises a backend portal interface, which may include a customer relationship management (CRM) platform. Such a backend portal interface allows a dealership to monitor activities across the entire vehicle purchase management platform 100. The status of each open vehicle purchase transaction is available in real time. In addition, data and statistics about past and active vehicle purchase transactions can be accessed. Such statistics can be used, for example, for process improvements or dealership representative evaluations. In addition, activities across entire vehicle purchase management platform 100 may automatically trigger reporting to dealer representatives and/or customers, as shown in FIG. 5. Such reporting may be accomplished by SMS text message to a mobile device or by other suitable communication protocol.

Figure 6:
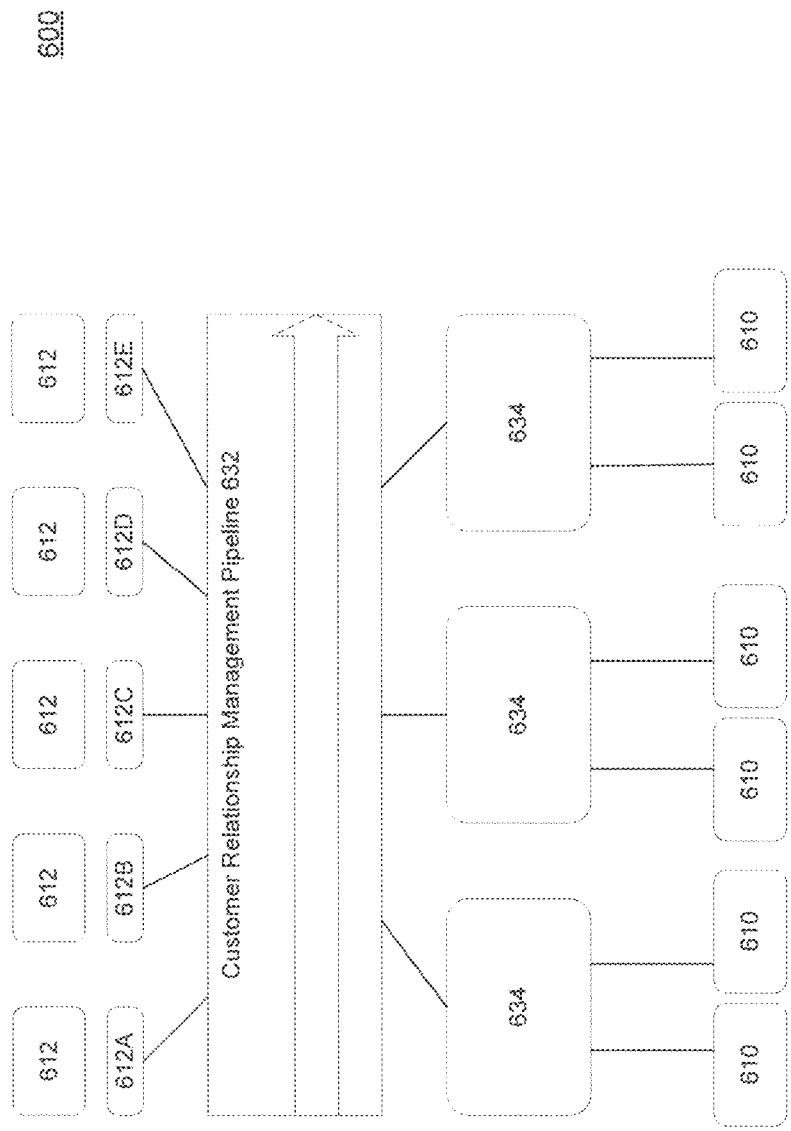
FIG. 6 illustrates an exemplary customer relationship management architecture according to an embodiment of the present disclosure.

FIG. 6 illustrates an integrated customer relationship management architecture 600 according to an embodiment of the disclosure. Architecture 600 is part of system 100 in FIGS. 1-5.

In FIG. 6, CRM pipeline 632 receives events corresponding to platform event handlers 612A through 613E from customer systems 612. For example, CRM pipeline 632 receives data from, including but not limited to, a customer interface submission (e.g., data entry by consumers on a user interface of vehicle purchase management platform 100) from customer systems 612 (e.g., consumer laptops or desktops, mobile devices, and the like). In an example, if a customer submits information about the customer's automobile insurance, schedules a service appointment, adds a dealer accessory to a vehicle purchase, etc., a platform event corresponding to the submission is generated and associated with an event handler. Platform event handlers 612A-613E determine how to process and submit customer events to the CRM pipeline 632. Customer and client devices can publish platform events onto the CRM pipeline 632 by sending the platform events to a certain Internet Protocol (IP) associated with the vehicle purchase management platform 100. Although five platform event handlers are shown in FIG. 6, the present disclosure is not limited to five platform event handlers. Embodiments of the present disclosure may have more than or less than five platform event handlers and still be within the scope of the present disclosure.

Platform events are typically high-volume data. Embodiments presented herein convert high-volume data into high-quality data. Conventionally, administrators had to produce code to convert the data into higher quality data. The embodiments presented herein software handlers to perform this function thereby significantly reducing time and cost required for the conversions.

Platform event handlers 612A-613E include modules such as marketing cloud predictive intelligence for sorting platform events received via the CRM pipeline 632 and convert high-volume event data into lower volume, higher quality data. For example, event handlers 612A-613E can parse events from the CRM pipeline 632 to determine whether insurance information is being transmitted by a consumer. Events may include a customer identification (ID) to identify a customer, a dealer ID to identify a dealer, a vehicle ID to identify an associated vehicle, etc. CRM pipeline 632 can include a security model that can defines who is allowed to get and how they are received. CRM pipeline 632 can provide a common abstraction layer for disparate, different dealer systems and customers and a common shared bus for events across different systems. CRM pipeline 632 can be configured such that different systems can't communicate directly with each other through the pipeline. The events on CRM pipeline 632 are securely isolated from each other.

CRM pipeline 632 allows for event publish/event subscribe rules. The event publish/event subscribe rules provide for what event can be published to the CRM pipeline 632 by a customer, what event can be subscribed to on the CRM pipeline 632 by a customer or dealer, and what happens when a customer or dealer subscribes to a particular event on the CRM pipeline 632. Publications rules can be configured, for example, by dealer systems processes 634, which can be an embodiment of dealer systems processes 334, for example. In some embodiments, dealer system processes 634 (e.g., dealer process spaces 334) can be configured specifically for each subscribing dealer. In a non-limiting example, an administrator can create a dealer process space 334 for a first dealer, and a separate isolated dealer process space for a second dealer 334. Dealer system processes can thereby be configured for each dealer based on the respective isolated dealer process space. Each dealer system process can be configured as a handler to filter particular events on the CRM pipeline based on a configuration specified in the respective dealer process space. A filter criteria can be applied for a given event to limit how events published to CRM pipeline 632 are shared, for example, customizable by each dealer. For example, a particular dealer may configure an associated dealer system process 634 to provide a live, real time log of customer insurance information submissions for review by an agent of the dealer. For any given event, the payload can be enriched with additional information before publishing to CRM pipeline 632. Platform event publish/event subscribe rules configured and/or customized by dealer systems processes 634 can define the schema, version, and security of the events.

Figure 7:
FIG. 7 illustrates an exemplary customer interface according to an embodiment of the present disclosure.
Figure 7:
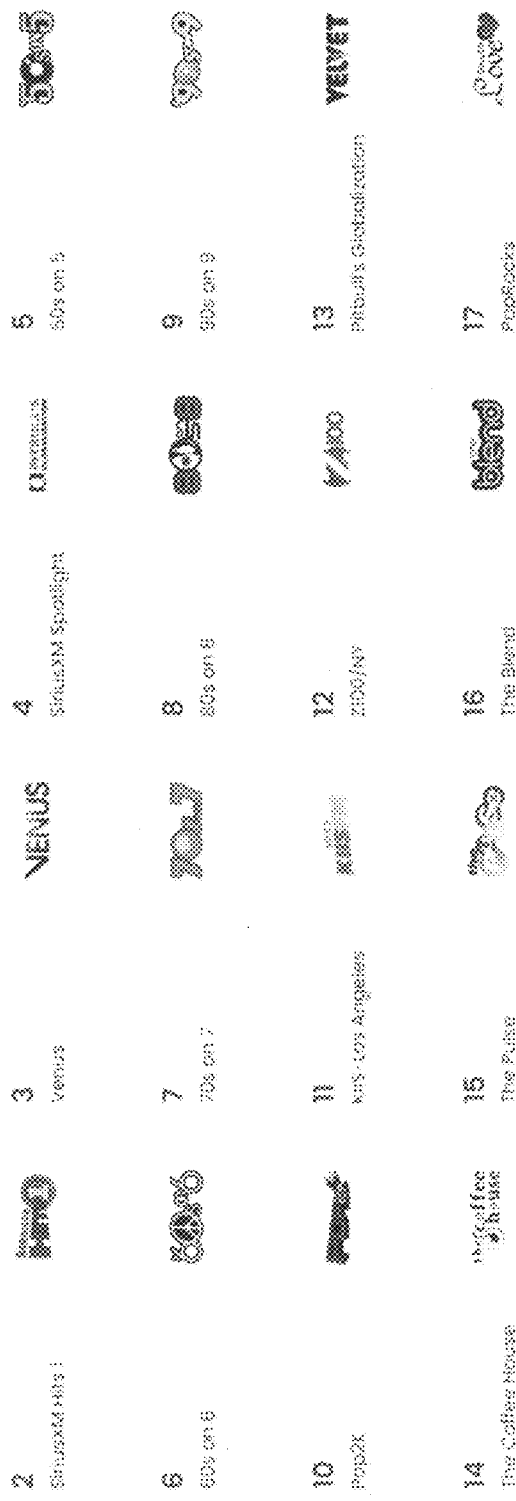
Figure 8:
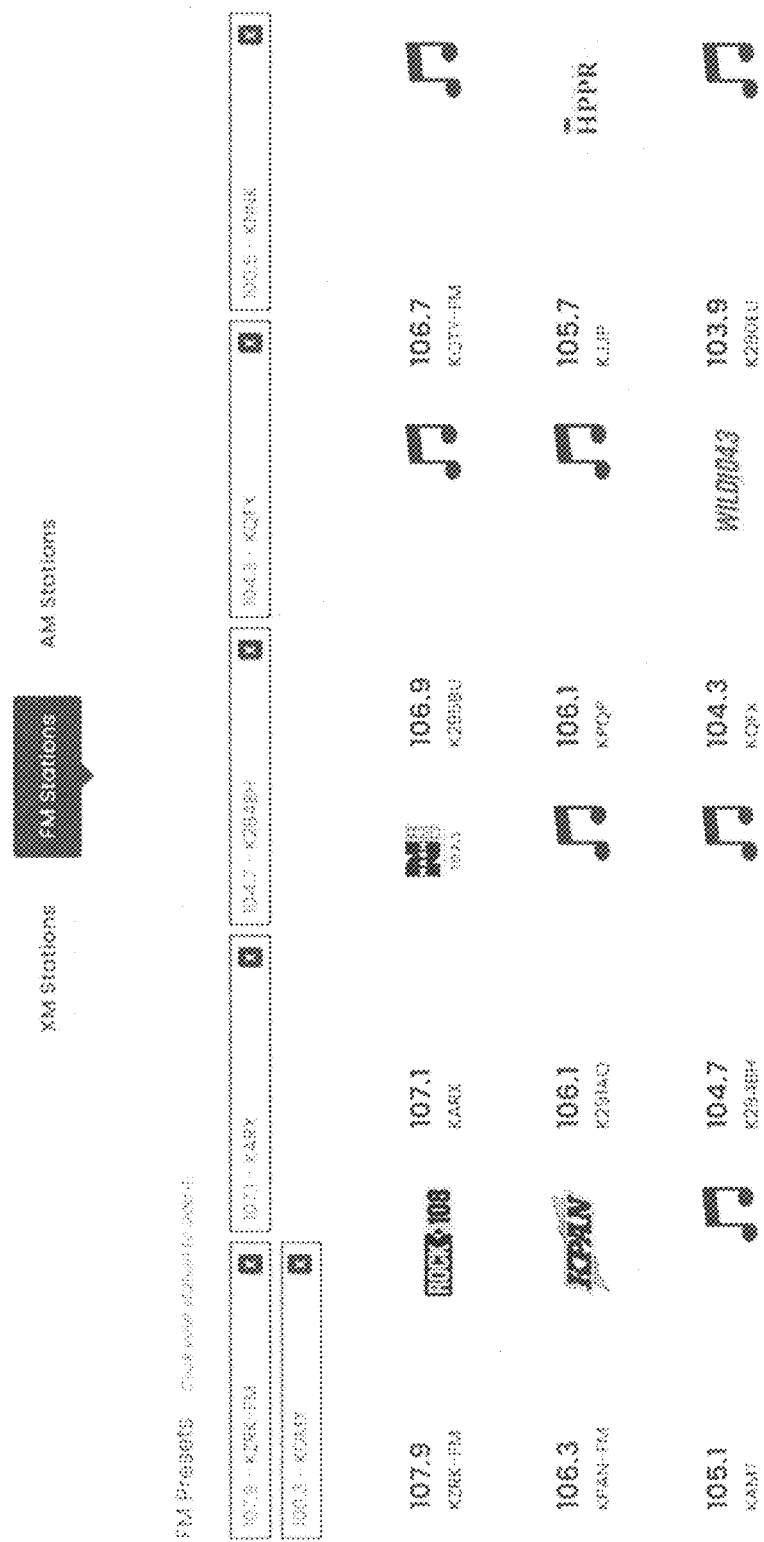
FIG. 8 illustrates an exemplary customer interface according to an embodiment of the present disclosure.

FIGS. 7-8 illustrate an exemplary customer interface according to at least one embodiment of the present disclosure. FIGS. 7-8 show a customer interface that may appear on client system 212 and/or client system 312, such as, but not limited to, a laptop or tablet. As shown in FIGS. 7-8, the customer is presented with options for presetting stations on SiriusXM radio (FIG. 7) and FM radio (FIG. 8). According to at least one embodiment of vehicle purchase management platform 100, the present radio stations selected by the customer are then implemented by dealership personnel prior to delivery of the vehicle to the customer.

Figure 9:
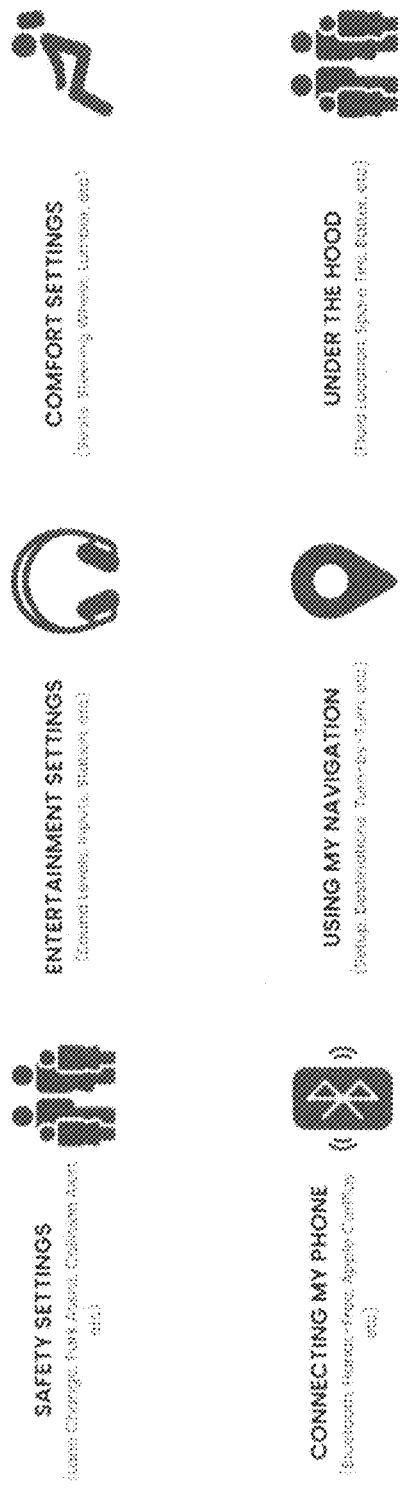
FIG. 9 illustrates an exemplary customer interface according to an embodiment of the present disclosure.

FIG. 9 illustrates an exemplary customer interface according to at least one embodiment of the present disclosure. FIG. 9 shows a customer interface that may appear on client system 212 and/or client system 312, such as, but not limited to, a laptop or tablet. As shown in FIG. 9, the customer is presented by vehicle purchase management platform 100 with options for learning about vehicle features and/or presetting vehicle options. According to at least one embodiment of vehicle purchase management platform 100, the selections made by the customer are then implemented by dealership personnel prior to delivery of the vehicle to the customer.

Figure 10:
FIG. 10 illustrates an exemplary customer interface according to an embodiment of the present disclosure.

FIG. 10 illustrates an exemplary customer interface according to at least one embodiment of the present disclosure. FIG. 10 shows a customer interface that may appear on client system 212 and/or client system 312, such as, but not limited to, a laptop or tablet. As shown in FIG. 10, the customer is presented by vehicle purchase management platform 100 with options for add-on accessories for the vehicle being purchased. According to at least one embodiment of vehicle purchase management platform 100, the selections made by the customer are then implemented by dealership personnel prior to delivery of the vehicle to the customer.

Figure 11:
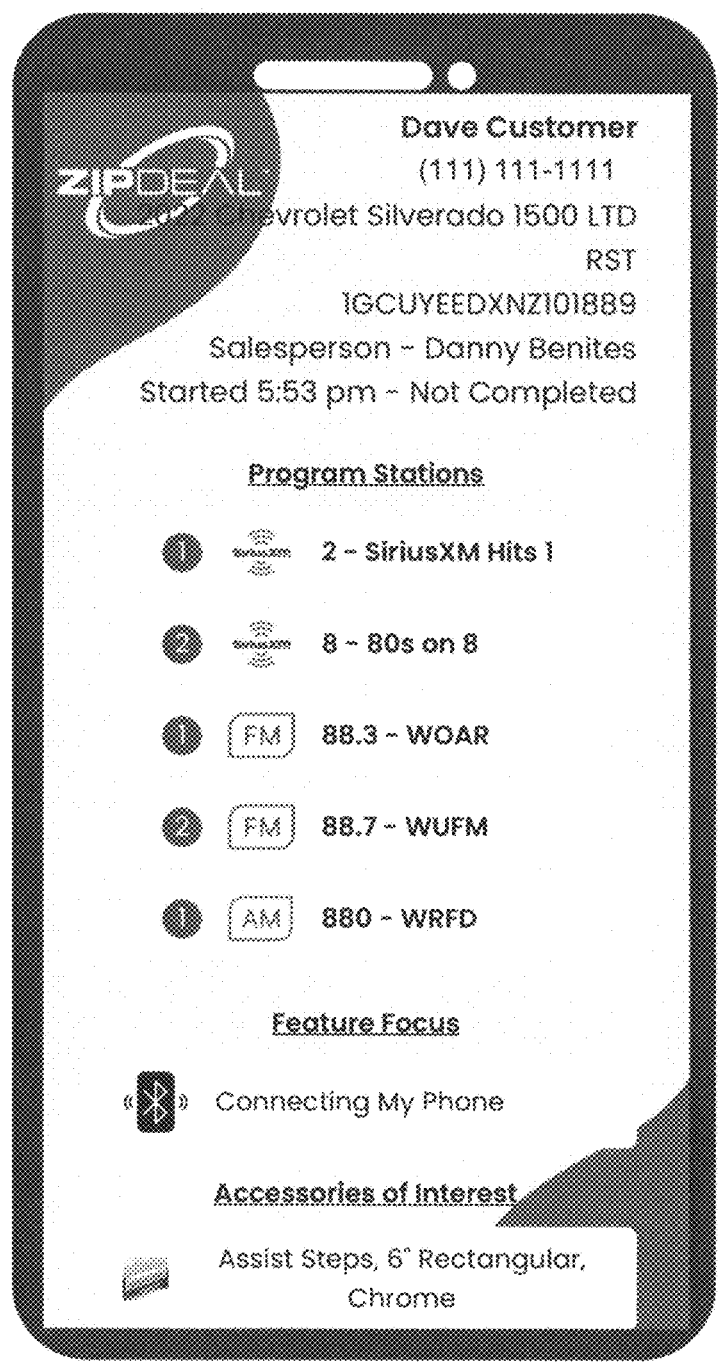
FIG. 11 illustrates an exemplary customer interface according to an embodiment of the present disclosure.

FIG. 11 illustrates an exemplary customer interface according to at least one embodiment of the present disclosure. FIG. 11 shows a customer interface that may appear on client system 212 and/or client system 312, such as, but not limited to, a smart phone. As shown in FIG. 11, certain selections made by the customer through by vehicle purchase management platform 100, including radio presets, the request by the customer to have the customer's connected to the vehicle, and add-on accessories desired, are reported to the customer.

Figure 12:
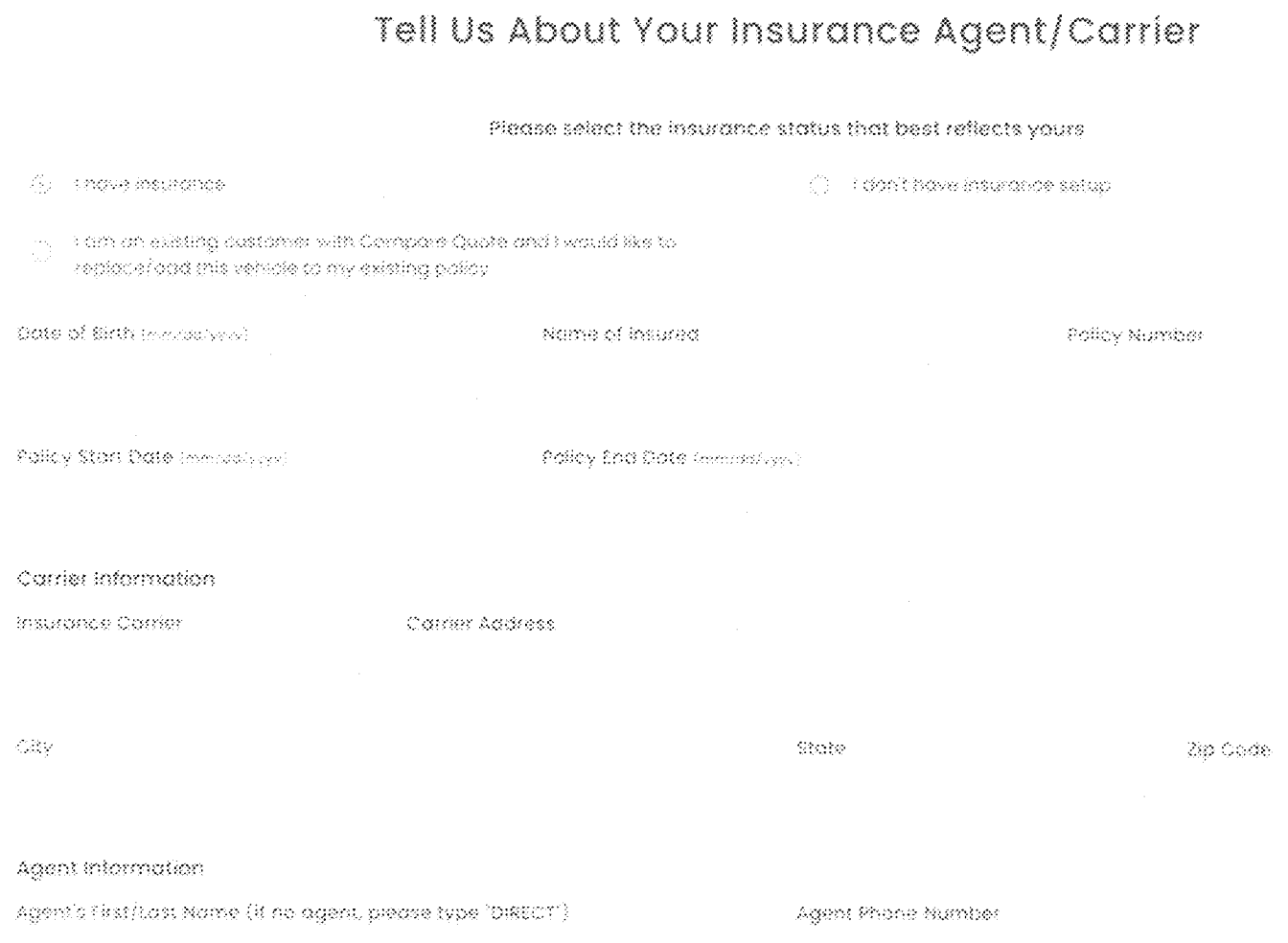

FIG. 12 illustrates an exemplary customer interface according to at least one embodiment of the present disclosure. FIG. 12 shows a customer interface that may appear on client system 212 and/or client system 312, such as, but not limited to, a laptop or tablet. As shown in FIG. 12, information about the customer's automobile insurance can be collected by vehicle purchase management platform 100. This information can then be used by the dealership in the F&I process to accelerate that process for the customer.

Figure 13:
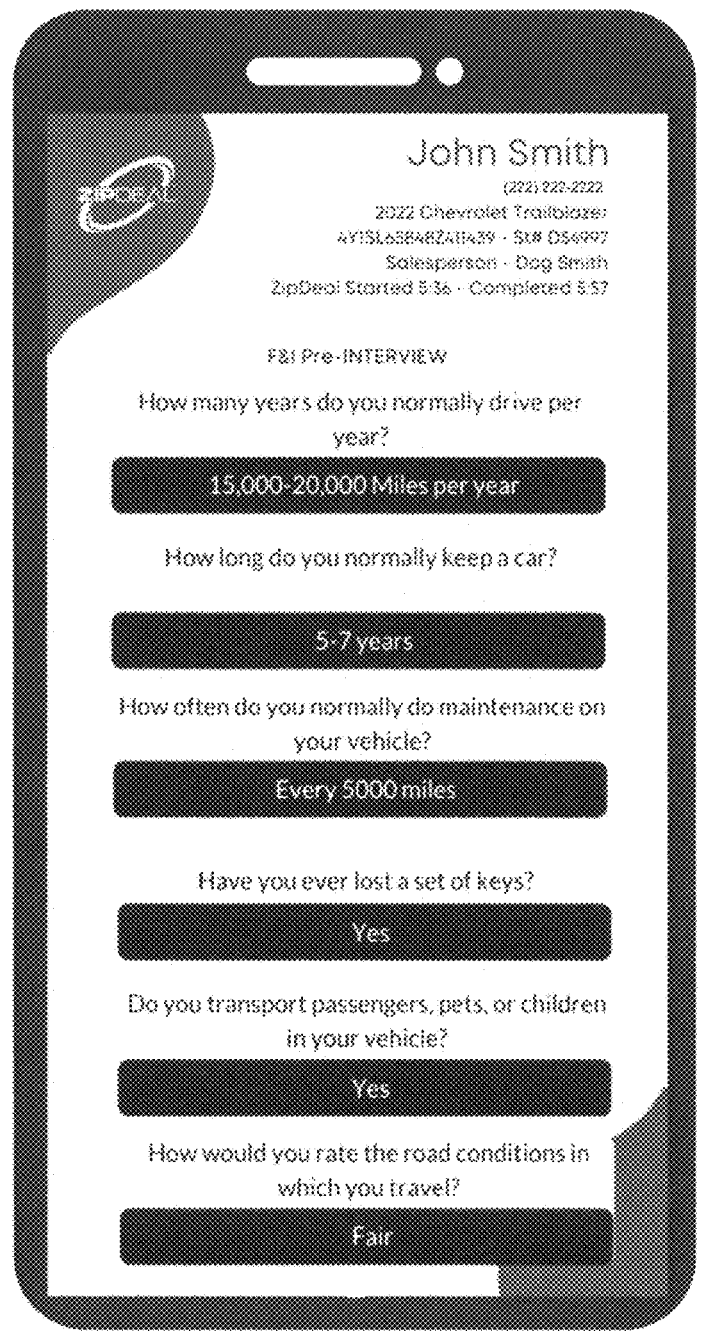
FIG. 13 illustrates an exemplary customer interface according to an embodiment of the present disclosure.

FIG. 13 illustrates an exemplary customer interface according to at least one embodiment of the present disclosure. FIG. 13 shows a customer interface that may appear on client system 212 and/or client system 312, such as, but not limited to, a smart phone. As shown in FIG. 13, the results of a customer's pre-F&I interview conducted by vehicle purchase management platform 100 are displayed to the customer for confirmation. This information can then be used by the dealership in the F&I process to accelerate that process for the customer.

Figure 14:
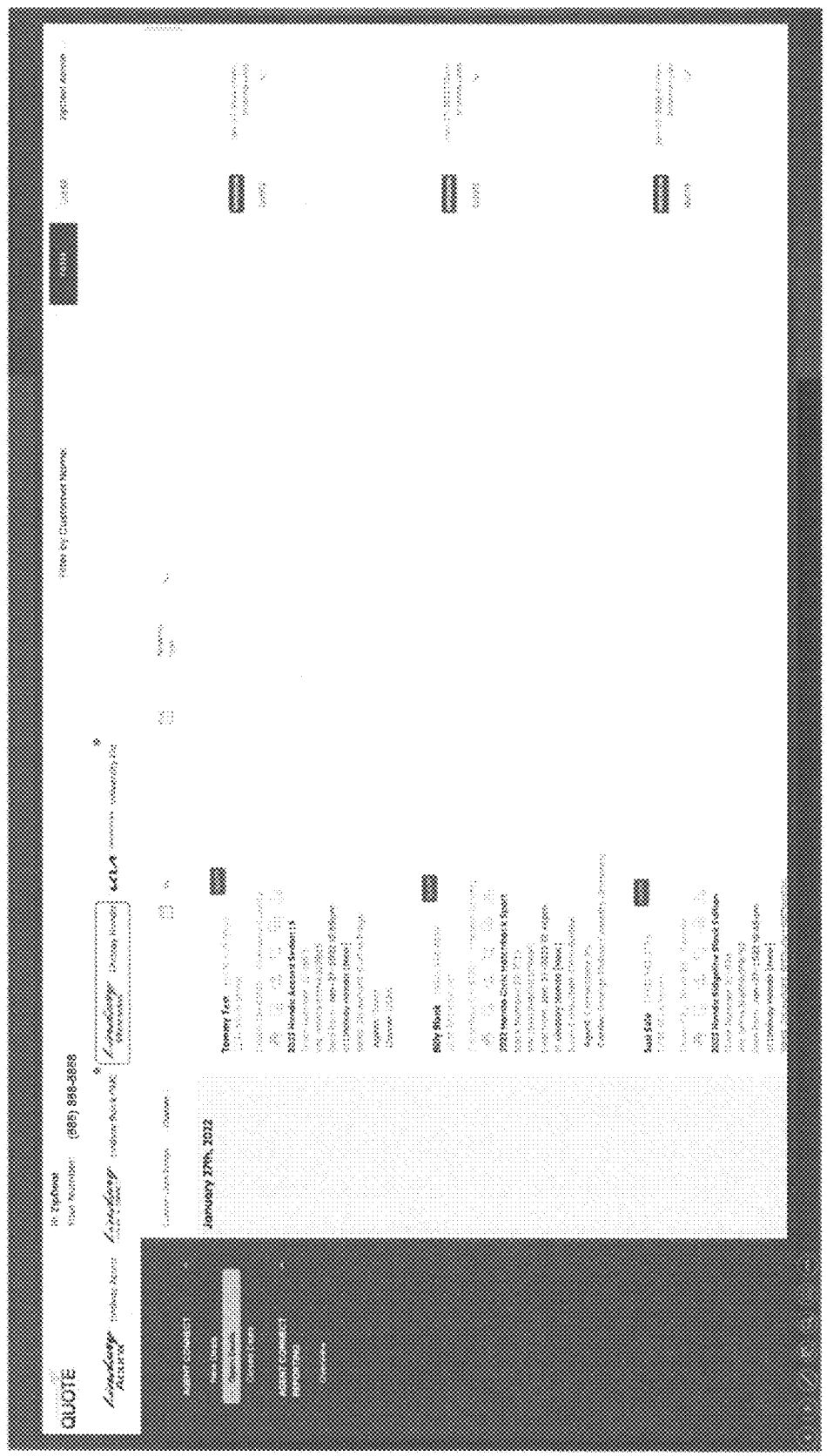
FIG. 14 illustrates an exemplary customer interface according to an embodiment of the present disclosure.

FIG. 14 illustrates an exemplary user interface according to at least one embodiment of the present disclosure. FIG. 14 shows a user interface that may appear on dealer system 210 and/or dealer system 310, such as, but not limited to, a laptop or tablet. As shown in FIG. 14, the user interface may retrieve and/or display information from vehicle purchase management platform 100 to enable a user, such as a dealer agent, insurance agent, and the like, to view in real time information being transmitted from customers to vehicle purchase management platform 100. For example, a user interface illustrated as shown in FIG. 14 can be configured to be populated in real time with information collected via customer interfaces (shown, for example, in FIGS. 7 to 13, and 15 to 17). The user interface can be populated utilizing a CRM system as a component of vehicle purchase management platform 100. A CRM can be configured as an internal element of vehicle purchase management platform 100 or as a separate component connected to vehicle purchase management platform 100. For example, for example CRM can be configured as an embodiment of CRM platform 600. An agent may thereby confirm and/or present options for insurance coverage to a customer during the vehicle purchase process based on a live, real-time feed of information collected by the platform.

Figure 15:
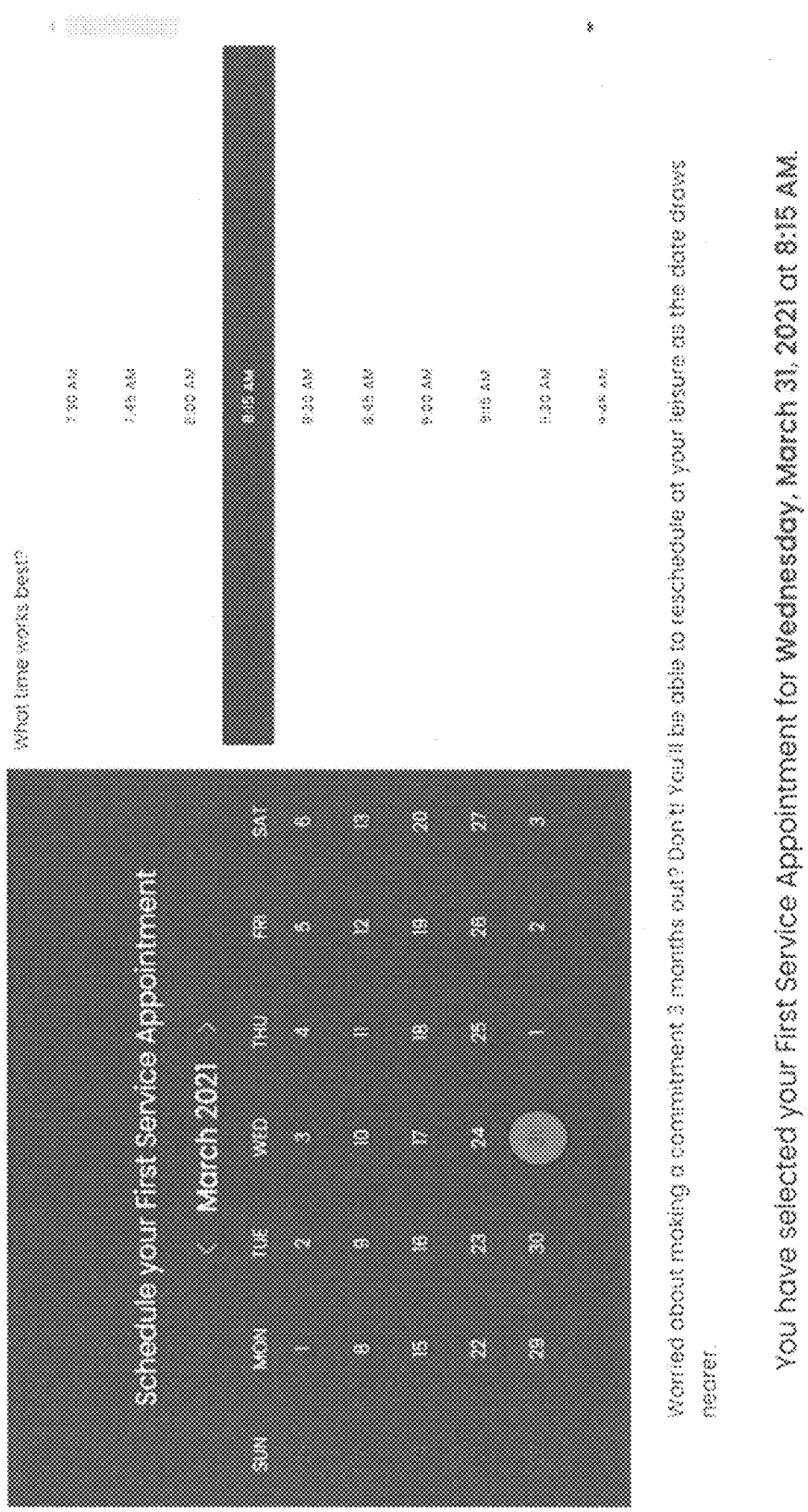
FIG. 15 illustrates an exemplary customer interface according to an embodiment of the present disclosure.

FIG. 15 illustrates an exemplary customer interface according to at least one embodiment of the present disclosure. FIG. 15 shows a customer interface that may appear on client system 212 and/or client system 312, such as, but not limited to, a laptop or tablet. As shown in FIG. 15, the customer is invited by vehicle purchase management platform 100 to schedule an initial service appointment for the newly purchased vehicle. This information can then be used by the dealership for service department purposes. In addition, like the user interface of FIG. 14, a user interface that may appear on dealer system 210 and/or dealer system 310 can retrieve and display service appointments scheduled in real-time, such that a user such as a dealer agent, service agent, and the like, can view a live log of service appointments scheduled through vehicle purchase management platform 100.

Figure 16:
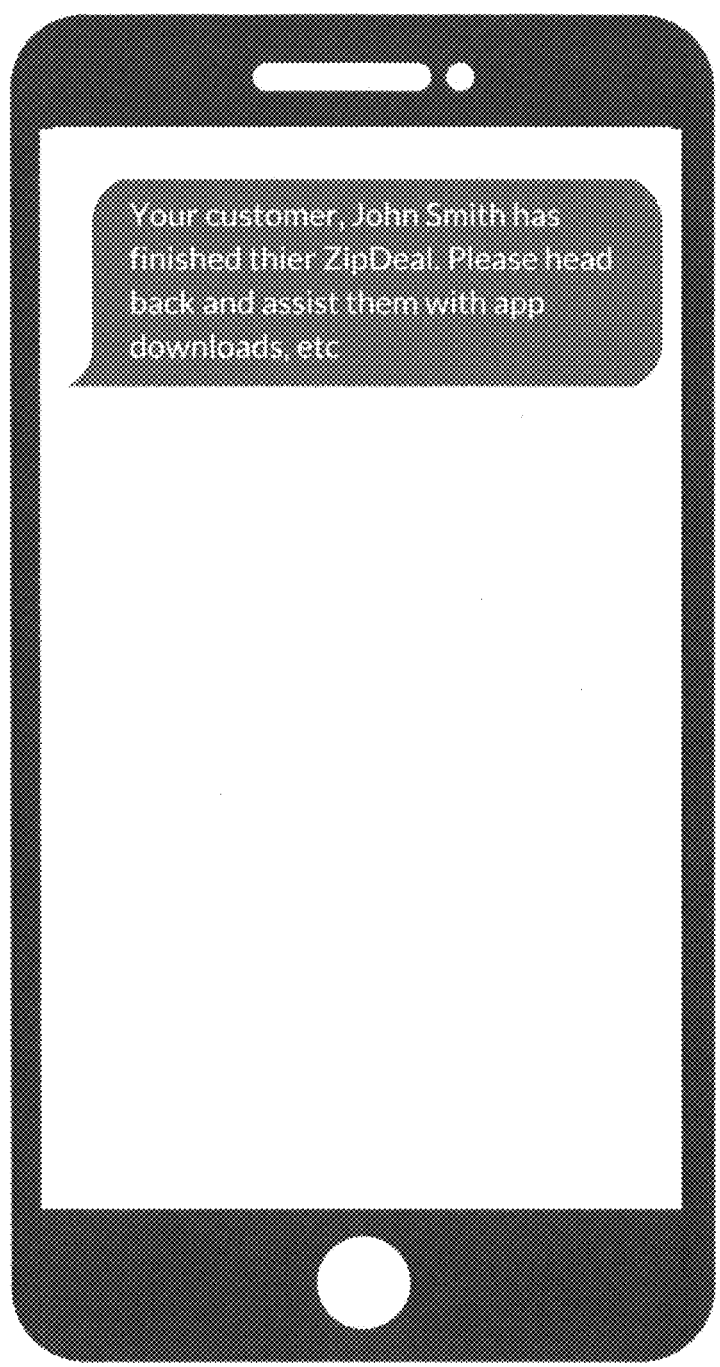
FIG. 16 illustrates an exemplary customer interface according to an embodiment of the present disclosure.

FIG. 16 illustrates an exemplary dealership representative interface according to at least one embodiment of the present disclosure. FIG. 16 shows a customer interface that may appear on dealer system 210 and/or dealer system 310, such as, but not limited to, a smart phone. As shown in FIG. 16, vehicle purchase management platform 100 identifies that the customer's vehicle is ready for delivery, so the dealership representative is notified by vehicle purchase management platform 100 to engage with the customer for final vehicle delivery activities.

Figure 17:
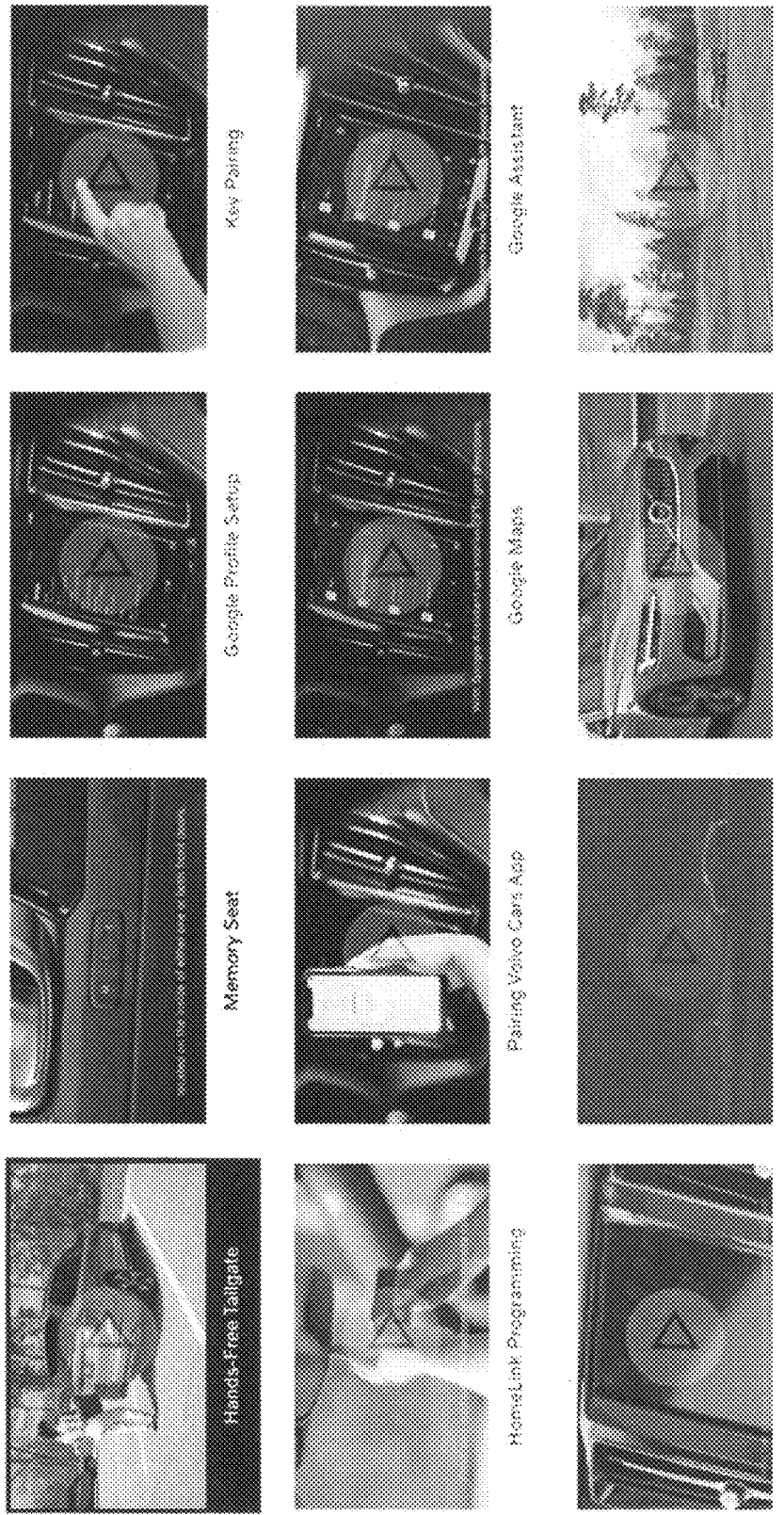
FIG. 17 illustrates an exemplary customer interface according to an embodiment of the present disclosure.

FIG. 17 illustrates an exemplary customer interface according to at least one embodiment of the present disclosure. FIG. 17 shows a customer interface that may appear on client system 212 and/or client system 312, such as, but not limited to, a laptop or tablet. As shown in FIG. 17, vehicle purchase management platform 100 identifies that the customer's vehicle is ready for delivery, so the customer is notified by vehicle purchase management platform 100 that a dealership representative will re-engage with the customer for final vehicle delivery activities.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, or entities illustrated in the figures or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an exemplary embodiment," or similar phrases, indicate that the embodiment described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected," along with their derivatives. These terms are not necessarily intended as synonyms for each other. For example, some embodiments can be described using the terms "connected" or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

The invention claimed is:

1. A computer-implemented system, comprising:
a memory;
a processor coupled to the memory and configured to, based on instructions stored in the memory, perform operations comprising:
retrieving a first identifier associated with an automotive vehicle from a storage location;
retrieving vehicle data related to the automotive vehicle off the storage location;
retrieving a second identifier associated with a customer from a storage location;
retrieving customer data related to the customer off the storage location;
associating the vehicle data and the customer data to one or more modules for performing post-agreement process, the post-agreement process being configured to generate information for transmission to a user system;
transmitting, by the one or more modules, a user interface to a customer system;
generating a trigger event for the customer based on a predetermined rule;
generating, in response to the customer trigger event, a notification for a user of the user system, wherein the user is associated with a vehicle dealer; and
sending the notification to the user based on contact information of the user in a dealer record.

2. The computer-implemented system according to claim 1, the operations further comprising: associating the vehicle data and the customer data to a personalization module to generate the user interface, wherein the user interface provides one or more customized insurance policy quotes from one or more insurance providers based on the vehicle data and the customer data.

3. The computer-implemented system according to claim 1, the operations further comprising: associating the vehicle data and the customer data to a personalization module to generate the user interface, wherein the user interface provides one or more customized add-on modules based on a dealer configuration.

4. The computer-implemented system according to claim 1, the operations further comprising: associating the vehicle data and the customer data to a personalization module to generate the user interface, wherein the user interface provides one or more options for vehicle-specific accessories based on the vehicle data.

5. The computer-implemented system according to claim 1, the operations further comprising: performing an automated pre-F&I interview with the customer by the one or more modules.

6. The computer-implemented system according to claim 1, the operations further comprising: promoting appearance protection packages to the customer, the appearance protection packages associated with the vehicle data and configured by the dealer.

7. The computer-implemented system according to claim 1, the operations further comprising: associating the vehicle data and the customer data to a personalization module to generate the user interface, wherein the user interface provides one or more options to personalize a customer's radio presets.

8. The computer-implemented system according to claim 1, the operations further comprising: associating the vehicle data and the customer data to a personalization module to generate the user interface, wherein the user interface provides one or more options for vehicle-specific products based on the vehicle data such as extended warranties, vehicle protection packages, and tire protection packages.

9. A computer-implemented method, wherein one or more computing devices comprising non-transitory memory and at least one processor are programmed to perform steps comprising:

retrieving, by at least one processor, a first identifier associated with an automotive vehicle from a storage location;

retrieving, by the at least one processor, vehicle data related to the automotive vehicle off the storage location;

retrieving, by the at least one processor, a second identifier associated with a customer from a storage location;

retrieving, by the at least one processor, customer data related to the customer off the storage location;

associating, by the at least one processor, the vehicle data and the customer data to one or more modules for performing post-agreement process, the post-agreement process being configured to generate information for transmission to a user system;

transmitting, by the one or more modules, a user interface to a customer system;

generating a trigger event for the customer based on a predetermined rule;

generating, in response to the customer trigger event, a notification for a user of the user system, wherein the user is associated with a vehicle dealer; and sending the notification to the user based on contact information of the user in a dealer record.

10. The computer-implemented method according to claim 9, the operations further comprising: associating the vehicle data and the customer data to a personalization module to generate the user interface, wherein the user interface provides one or more customized insurance policy quotes from one or more insurance providers based on the vehicle data and the customer data.

11. The computer-implemented method according to claim 9, the operations further comprising: associating the vehicle data and the customer data to a personalization module to generate the user interface, wherein the user interface provides one or more customized add-on modules based on a dealer configuration.

12. The computer-implemented method according to claim 9, the operations further comprising: associating the vehicle data and the customer data to a personalization module to generate the user interface, wherein the user interface provides one or more options for vehicle-specific accessories based on the vehicle data.

13. The computer-implemented method according to claim 9, the operations further comprising: performing an automated pre-F&I interview with the customer by the one or more modules.

14. The computer-implemented method according to claim 9, the operations further comprising: promoting appearance protection packages to the customer, the appearance protection packages associated with the vehicle data and configured by the dealer.

15. The computer-implemented method according to claim 9, the operations further comprising: associating the vehicle data and the customer data to a personalization module to generate the user interface, wherein the user interface provides one or more options to personalize a customer's radio presets.

16. The computer-implemented method according to claim 9, the operations further comprising: associating the vehicle data and the customer data to a personalization module to generate the user interface, wherein the user interface provides one or more options for vehicle-specific products based on the vehicle data such as extended warranties, vehicle protection packages, and tire protection packages.

17. A non-transitory computer-readable apparatus having instructions stored thereon that, when executed by a computing device, cause the computing device to perform operations comprising:

retrieving, by the computer device, a first identifier associated with an automotive vehicle from a storage location;

retrieving, by the computer device, vehicle data related to the automotive vehicle off the storage location;

retrieving, by the computer device, a second identifier associated with a customer from a storage location;

retrieving, by the computer device, customer data related to the customer off the storage location;

associating, by the computer device, the vehicle data and the customer data to one or more modules for performing post-agreement process, the post-agreement process being configured to generate information for transmission to a user system;

transmitting, by the one or more modules, a user interface to a customer system;

generating a trigger event for the customer based on a predetermined rule;

generating, in response to the customer trigger event, a notification for a user of the user system, wherein the user is associated with a vehicle dealer; and sending the notification to the user based on contact information of the user in a dealer record.

18. The non-transitory computer-readable apparatus according to claim 17, the operations further comprising: associating the vehicle data and the customer data to a personalization module to generate the user interface, wherein the user interface provides one or more customized insurance policy quotes from one or more insurance providers based on the vehicle data and the customer data.

19. The non-transitory computer-readable apparatus according to claim 17, the operations further comprising: associating the vehicle data and the customer data to a personalization module to generate the user interface, wherein the user interface provides one or more customized add-on modules based on a dealer configuration.

20. The non-transitory computer-readable apparatus according to claim 17, the operations further comprising: associating the vehicle data and the customer data to a personalization module to generate the user interface, wherein the user interface provides one or more options for vehicle-specific accessories based on the vehicle data.

21. The non-transitory computer-readable apparatus according to claim 17, the operations further comprising: performing an automated pre-F&I interview with the customer by the one or more modules.

22. The non-transitory computer-readable apparatus according to claim 17, the operations further comprising: promoting appearance protection packages to the customer, the appearance protection packages associated with the vehicle data and configured by the dealer.

23. The non-transitory computer-readable apparatus according to claim 17, the operations further comprising: associating the vehicle data and the customer data to a personalization module to generate the user interface, wherein the user interface provides one or more options to personalize a customer's radio presets.

24. The non-transitory computer-readable apparatus according to claim 17, the operations further comprising: associating the vehicle data and the customer data to a personalization module to generate the user interface, wherein the user interface provides one or more options for vehicle-specific products based on the vehicle data such as extended warranties, vehicle protection packages, and tire protection packages.

* * * * *